United States Patent
Bembenek

[15] 3,659,181
[45] Apr. 25, 1972

[54] AUTOMATIC BATTERY CHARGING REGULATOR FOR EMERGENCY LIGHTING AND POWER SYSTEMS

[72] Inventor: Edward Bembenek, Springfield, Mass.
[73] Assignee: Standard Electric Time Corp., Springfield, Mass.
[22] Filed: Mar. 12, 1970
[21] Appl. No.: 18,918

[52] U.S. Cl. ................................. 320/22, 320/39
[51] Int. Cl. ........................................ H02j 7/02
[58] Field of Search ........................ 320/39, 40, 22

[56] References Cited

UNITED STATES PATENTS

| | | | |
|---|---|---|---|
| 3,535,608 | 10/1970 | Cramer et al. | 320/40 X |
| 3,553,561 | 1/1971 | Lesher | 320/39 X |
| 3,159,755 | 12/1964 | Duncan | 320/4 X |
| 3,310,724 | 3/1967 | Grafham | 320/DIG. 2 |
| 3,412,308 | 11/1968 | Brown | 320/DIG. 1 |
| 3,443,191 | 5/1969 | Medlar | 320/DIG. 1 |
| 3,453,519 | 7/1969 | Hunter, Jr. | 320/DIG. 1 |
| 3,487,284 | 12/1969 | Cady | 320/DIG. 2 |
| 3,517,294 | 6/1970 | Ruben | 320/39 X |
| 3,517,295 | 6/1970 | Lapuyade | 320/39 X |
| 3,531,706 | 9/1970 | Mullersman | 320/39 X |

Primary Examiner—William M. Shoop, Jr.
Attorney—Arnold J. De Angelis

[57] ABSTRACT

A voltage sensing circuit monitors the battery voltage and places the battery on "fast charge" rate through a silicon controlled rectifier, when the monitored battery voltage drops to a predetermined value. When the battery has charged to a certain value, the battery is automatically returned to a "trickle charge" rate through a parallel circuit. A clamping circuit maintains the circuit in "trickle" charge condition until the battery voltage is again sensed to have fallen below the first aforementioned desired predetermined value preventing "hunting" of the battery by providing control with a voltage differential between the "trickle" and "fast" charging rates.

7 Claims, 1 Drawing Figure

Patented April 25, 1972
3,659,181
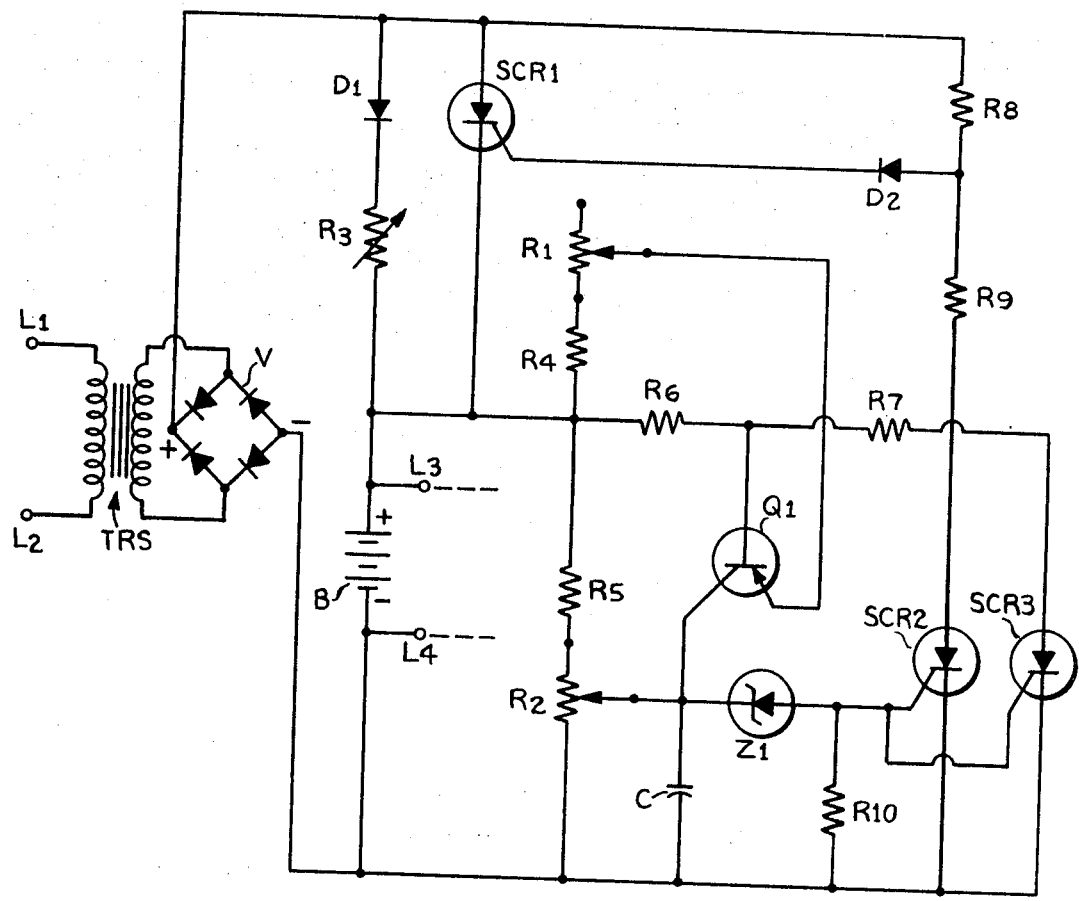
EDWARD BEMBENEK INVENTOR.
BY G. J. De Angelis
ATTORNEY.

AUTOMATIC BATTERY CHARGING REGULATOR FOR EMERGENCY LIGHTING AND POWER SYSTEMS

The invention relates to voltage sensing circuits for monitoring the voltage level of a voltage source and more particularly, to such a circuit for use as a battery charging regulator.

Battery charging voltage regulators usually provide for removing the charging current when the battery voltage rises to full charge and automatically applying charging current when the battery falls below full charge level.

Batteries used for emergency power, in present day practice are usually maintained "on line" in a "stand by" condition, while a "trickle" charge is constantly being applied to the battery to maintain it at a predetermined level. When normal power fails, and an emergency load is applied to the battery, the battery begins to discharge, causing its voltage to drop slowly. When the battery voltage drops to a certain level below the aforementioned trickle charge maintenance voltage, a voltage sensing circuit places the regulation circuit in condition for charging of the battery at a relatively fast rate when normal power is restored. Under such conditions, upon restoration of power, the battery is "fast" charged to a fully charged condition. Upon the battery attaining fully charged condition, a voltage sensing circuit places the battery on the slow "trickle" charge again to prevent "gassing" and evaporation of the electrolyte which may lead to premature battery failure.

It is, therefore, desirable to provide in a battery charging regulator circuit of the voltage sensing type, a voltage differential control to provide a positive transfer from a fast charge rate to a trickle charge rate with sufficient differential between transfer points to prevent "hunting" of the regulator at near the fully charged voltage of the battery source, while obtaining latching of the regulator in trickle charge condition until the battery again falls below a predetermined level.

In carrying out the invention, according to a preferred embodiment, upon transfer of the voltage sensing circuit which monitors the voltage source from a fast charge rate condition to a trickle charge rate condition, clamping means responsive to such transfer clamp the voltage sensing means in trickle charge condition, providing for actuation to fast charge condition at a voltage substantially lower than the trickle voltage condition of the voltage source.

Features and advantages of the invention will be seen from the above and from the following description of the preferred embodiment, when considered in conjunction with the drawing and from the appended claims.

In the drawing, there is a schematic wiring diagram of a "stand by" voltage source in the form of battery B being maintained under trickle charge condition by an automatic battery charging regulator embodying the invention.

The voltage source to be monitored is a battery B connected to output terminals L3,L4 for supplying emergency or stand by power to a load (not shown). Power is supplied to the battery charging circuit from any convenient alternating current source (not shown) over supply lines L1,L2 at, say approximately 120 volts, 60 cycles. This power is transformed by transformer TRS and rectified by full wave rectifier V connected across the secondary winding of the transformer to apply rectified power at approximately 49 volts to the circuit.

The rectified power is usually applied across battery B at a trickle charge rate, the circuit extending from the output of full wave bridge rectifier V through a diode D1 and an adjustable resistor R3 for adjusting the rate of charge. Fast charging of the battery is accomplished through the anode-cathode circuit of a silicon controlled rectifier SCR1 connected in shunting relation to diode D1 and resistor R3. The gate of rectifier SCR1 is connected through a diode D2 to the midpoint of a voltage divider comprising resistors R8,R9. These resistors are in series with each other in the anode-cathode circuit of another silicon controlled rectifier SCR2 to provide a series circuit connected across the output of rectifier V and in parallel with the aforementioned charging circuits for controlling firing of rectifier SCR1, as will be later explained. Diode D2 prevents false firing of rectifier SCR1 due to small voltage transients.

The voltage sensing and monitoring circuit for battery B includes a fixed resistor R5 and an adjustable resistor R2 in series therewith across the terminals of battery B, a capacitor C connected across selected portions of resistor R2 by means of an adjustable tap on the resistor, a zener diode Z1 connected from the adjustable tap of resistor R2 to the gate of silicon controlled rectifier SCR2 for controlling firing of rectifier SCR2 when a selected voltage is sensed across battery B. A biasing resistor R10 connects the gate electrode of rectifier SCR2 to its cathode electrode.

A circuit for clamping zener diode Z1 in its avalanched condition includes a transistor Q1 with its base electrode connected to a voltage divider circuit comprising resistors R6,R7 connected in series from the positive terminal of battery B in the anode circuit of a third silicon controlled rectifier SCR3, whose cathode electrode is connected to the negative terminal of battery B. The gate electrode of rectifier SCR3 is connected directly to the gate electrode of the second silicon controlled rectifier SCR2 in the voltage sensing circuit to cause slaved firing of rectifier SCR3 when rectifier SCR2 is caused to fire and conduct. The emitter electrode of transistor Q1 is connected by an adjustable tap to a resistor R1 which is connected in series with a fixed resistor R4 to the junction of the voltage sensing resistor network R5,R2 with the positive terminal of battery B.

The collector electrode of transistor Q1 is connected directly to the adjustable tap on voltage sensing resistor R2 where it interconnects with zener diode Z1.

In a test of the preferred embodiment battery charging at a fast rate was effected when the battery voltage dropped to approximately 32 volts. The battery was transferred to a trickle charge rate upon attaining 42 volts, the trickle rate voltage applied being approximately 39 volts. The following circuit components were used to provide this broad voltage differential control of fast rate charge and trickle charge: Rectifier SCR1 was selected of the C37 F type, while rectifiers SCR2 and SCR3 were selected C6F type. Transistor Q1 was selected of the 2N4037 type, while zener diode Z1 was selected of the IT16 type. Diodes D1 and D2 were of the IN2484 type. Capacitor C was selected of 100 microfarads. The following values of resistors were used:

| R1 | 5 Kilo ohms | R6 | 10 Kilo ohms |
| R2 | 15 Kilo ohms | R7 | 22 Kilo ohms |
| R3 | 500 ohms | R8 & R10 | 1 Kilo ohms |
| R4 & R5 | 200 ohms | R9 | 350 ohms |

In operation assume that alternating power from any convenient source (not shown) at approximately 120 volts is applied over supply lines L1,L2 to the circuitry under conditions where battery B is not called upon to supply stand by power to the load (not shown). Under such conditions, battery B is being charged at trickle rate through diode D1 and adjustable resistor R3, from step down transformer TRS and rectifier V, resistor R3 being adjusted to an ohmic value to reduce the rectified power applied to the battery to approximately 39 volts.

The previsously referred to fast charge rate circuit extending through the anode-cathode circuit of rectifier SCR1 is in off condition, since rectifier SCR1 is maintained in nonconducting condition as follows: With battery B maintained at approximately 39 volts under a trickle charge resistor R2 in the battery voltage sensing circuit is adjusted to provide approximately 16 volts to zener diode Z1. This causes zener diode Z1 to avalanche and apply a firing signal to the gate electrode of silicon controlled rectifier SCR2. Silicon controlled Rectifier SCR2 fires and conducts through its anode-cathode circuit, causing current flow through resistors R8 and R9 in its anode circuit. With rectifier SCR2 conducting, resistors R8 and R9 essentially constitute a voltage divider directly across the output terminals of full wave rectifier V. The value of resistors R8, R9, previously stated, are selected to reverse bias the gate electrode of silicon controlled rectifier SCR1 in the fast charge circuit under conditions where battery monitoring rectifier SCR2 is in conducting condition. Hence, with the battery voltage sensed to be 39 volts fast charge silicon controlled rectifier SCR1 is maintained in its off condition, (nonconducting) preventing fast charging of battery B through its anode-cathode circuit.

Under the assumed trickle charge condition of the circuit with rectifier SCR2 in conducting condition its slaved rectifier SCR3 also is caused to conduct simultaneously therewith. In conducting rectifier SCR3 provides a current path through its anode-cathode circuit extending through a voltage divider resistors R6 and R7 and across battery B. The value of resistor R1 is adjusted with relation to the impedance in the base circuit of transistor Q1 to cause transistor Q1 to conduct through its emitter-collector circuit under these conditions. Transistor Q1, upon conducting, applies a low impedance shunt path through resistors R1,R4 across the resistor network (R5,R2) connected to zener diode Z1 thereby clamping a reference voltage greater than 16 volts directly to the zener diode under conditions where the battery voltage is approximately 39 volts. This clamping voltage maintains the circuit in trickle charge condition by preventing the removal of the firing signal from the gates of silicon controlled rectifiers SCR2 and SCR3 through zener diode Z1 until the voltage monitoring circuit senses approximately 32 volts across the battery terminals, as will now be explained.

Next assume that the 120 volts alternating power applied to supply lines L1, L2 fails and an emergency load (not shown) is connected to output terminals L3,L4 of battery B. Feeding the load causes battery B to discharge, causing its terminal voltage to drop slowly. Assume that the battery voltage drops to approximately 32 volts. Under such conditions the voltage monitored by the battery voltage sensing circuit and applied to the zener diode Z1 through resistors R1,R4 and transistor Q1 drops to below the holding voltage of the zener diode, which holding voltage is approximately 16 volts. Zener diode Z1 stops conducting, removing the firing signal from the gates of silicon controlled rectifiers SCR2 and SCR3. As rectifier SCR3 ceases to conduct, transistor Q1 is placed back to nonconducting condition, removing the shunt path across resistors R5 and R2 in the monitoring circuit. As rectifier SCR2 ceases to conduct, a firing signal is applied through resistor R8 and diode D2 to the gate of silicon controlled rectifier SCR1. Rectifier SCR1 conducts, placing a low impedance shunt path through the rectifier directly across the trickle charge circuit of diode D1 and resistor R3, thereby placing battery B in condition for charging at a fast rate upon the resumption of the applied 120 volt power. Thus, the charging circuit is placed automatically in condition for the fast charge of the battery.

Next assume that the normal 120 volt power is reapplied and the emergency load is removed from the output terminals L3,L4 of battery B. Under such conditions battery B, as has been explained, is automatically charged at a fast rate through the prepared anode-cathode circuit of conducting rectifier SCR1. As battery B approaches its fully charged condition, the voltage across its output terminals rises. When this voltage approaches approximately 42 volts, battery B is considered fully charged. Any further charging, while not resulting in any significant voltage rise, will cause evaporation of the battery electrolyte and "gassing" of the battery. Potentiometer R2 is adjusted to apply a reference voltage of approximately 16 volts to zener diode Z1, when the battery voltage rises to approximately 42 volts. As was previously explained, this causes zener diode Z1 in the battery voltage monitoring circuit to avalanche, placing a firing signal on the gate electrodes of rectifiers SCR2 and SCR3, again placing them in conducting condition. Rectifier SCR2, upon conducting, by means of current flow through the voltage divider network R8,R9 in its anode circuit places fast charge rate rectifier SCR1 in nonconducting condition, terminating the fast charging of battery B and returning the circuit to trickle charging of the battery B through diode D1 and resistor R3. Rectifier SCR3, upon conducting, causes current flow through resistors R7,R6 in the base circuit of transistor Q1, causing it to conduct through its emitter-collector circuit, as was previously explained placing a "clamping" voltage higher than 16 volts to zener diode Z1.

It may be noted that transistor Q1, upon conducting, places resistors R1,R4 across resistor R5 and a portion of resistor R2 lowering the impedance of that voltage divider at the take off point for zener diode Z1. This effectively reduces the total resistance and, thus causes a high reference voltage to be applied to zener diode Z1. This allows battery B to return to its trickle charge rate voltage, say 39 volts, while zener diode Z1 continues to see a voltage greater than 16 volts. The circuit is therefore, maintained in its avalanched condition. Thus, this clamping circuit maintains zener diode Z1 in conducting condition and the charging circuit in trickle charge rate at 39 volts with no hunting or excessive gassing of the battery until the battery falls to approximately 32 volts upon being placed across the load as was previously described.

It may be noted that without the clamping circuit of rectifier SCR3, resistor network R6,R7 R1 and R4 and transistor Q1 to maintain zener diode Z1 clamped at above 16 volts, as the battery attains full charge towards 42 volts, zener Z1 would conduct, causing rectifier SCR1 to stop conducting, removing the fast charging circuit. However, under these conditions, (without the clamping voltage to zener Z1 applied by transistor Q1) within seconds the battery voltage would again drop to below 42 volts. The voltage sensing circuit would again sense this drop applying less than 16 volts to zener diode Z1. The diode Z1 would again conduct, stopping conduction of rectifier SCR2 and causing firing and conducting of SCR1 to reapply the fast charging rate through battery B. This would result in hunting of the battery charging circuit from fast charge to trickle charge with resultant damage to battery B. Thus, it can be seen that the subject battery regulating and charging circuit is characterized by a means for clamping the charger in trickle charge condition with an adjustable substantial voltage differential control between initiation of the fast charging rate and termination of the fast charging rate for return to trickle condition.

As changes can be named in the above described construction many apparently different embodiments of this invention can be made without departing from the scope thereof, it is intended that all matter in the above description or shown on the accompanying drawing be interpreted as illustrative only and not in a limiting sense.

What is claimed is:

1. For a battery supplying power selectively to a load,
   a source of unidirectional power,
   a first charging circuit including impedance means connecting said battery across said power source for charging at a predetermined slow rate,
   a second charging circuit including switching means for selectively applying a low impedance shunt path across said first charging circuit for causing a relatively much faster charging rate of said battery,
   circuit means for monitoring the voltage across said battery terminals,
   said monitoring circuit means being actuated from a first condition to a second condition in response to voltage at said terminals decreasing to below at least a predetermined level,
   said monitoring circuit means being actuated from said second condition to said first condition in response to voltage to said terminals increasing a certain amount above said predetermined level,
   said second charging circuit being responsive to actuation of said monitoring circuit means from said first condition to said second condition for applying said low impedance shunt path across said first charging circuit for increasing charging rate of said battery to said faster rate,
   characterized in that there are provided, voltage differential means responsive to actuation of said monitoring means to said first condition for providing a selected differential of said monitored voltage for actuating said monitoring means to said second condition.

2. The circuit of claim 1 wherein said voltage differential means includes, clamping means responsive to actuation of said monitoring means back to said first condition for applying a signal to said monitoring means of a character for maintaining said monitoring means in said first condition preventing operation of said shunt path under conditions where said first charging circuit is operatively charging said battery.

3. The circuit arrangement of claim 2 wherein, said shunt switching means includes a silicon controlled rectifier having its anode-cathode circuit in shunting relation to said first charging circuit for applying a low impedance shunt path across it under conducting conditions of said rectifier.

4. The circuit of claim 3 wherein, said battery monitoring circuit includes an adjustable voltage divider network connected across said battery terminals, and a second silicon controlled rectifier with its gate electrode connected to a selected point on said voltage divider network, and with its cathode-anode circuit across said power source for placing said second rectifier in conducting condition when said monitored battery terminal voltage increases said certain amount above said predetermined level, and wherein the gate electrode of said first silicon controlled rectifier is connected to the anode circuit of said second silicon controlled rectifier for maintaining said first silicon controlled rectifier in nonconducting condition under conditions where said second silicon controlled rectifier conducts through its anode-cathode circuit.

5. The circuit of claim 4 wherein said monitoring means includes avalanching means connecting said gate electrode of said second rectifier to said voltage divider network for applying a firing signal to said second rectifier when said monitored voltage increases above said predetermined level.

6. The circuit of claim 5 wherein, said clamping means is responsive to conduction of said second silicon controlled rectifier for applying an increased voltage to said avalanching means for maintaining said avalanching means at a certain amount above its avalanching value for maintaining said circuit in slow charging condition under conditions where said power source maintains said battery terminal voltage at least at said certain amount above said predetermined level.

7. The circuit of claim 6 wherein, said clamping means includes a transistor and interconnecting circuit means responsive to conduction of said second silicon controlled rectifier for placing said transistor in conducting condition when said second silicon controlled rectifier conducts for applying a low impedance path across a selected portion of said voltage divider network for increasing the magnitude of the voltage signal applied to said avalanching means for clamping said avalanching means in avalanched condition with a voltage signal a predetermined amount above its avalanching value.

* * * * *